US009391867B2

(12) United States Patent
Griswold (10) Patent No.: US 9,391,867 B2
(45) Date of Patent: Jul. 12, 2016

(54) METHOD AND IMPLEMENTATION FOR NETWORK INSTRUMENTATION AND TRAFFIC DISPOSITION WITH TIMESTAMPS

(71) Applicant: BROADCOM CORPORATION, Irvine, CA (US)

(72) Inventor: Mark David Griswold, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 279 days.

(21) Appl. No.: 13/975,108

(22) Filed: Aug. 23, 2013

(65) Prior Publication Data

US 2015/0052240 A1 Feb. 19, 2015

Related U.S. Application Data

(60) Provisional application No. 61/865,979, filed on Aug. 14, 2013.

(51) Int. Cl.
*G06F 15/173* (2006.01)
*H04L 12/26* (2006.01)

(52) U.S. Cl.
CPC .......... *H04L 43/106* (2013.01); *H04L 43/0852* (2013.01)

(58) Field of Classification Search
CPC ............ H04L 41/5009; H04L 41/5019; H04L 43/106; H04L 65/607; H04L 65/22
See application file for complete search history.

(56) References Cited

U.S. PATENT DOCUMENTS

| 6,252,891 B1* | 6/2001 | Perches ................. H04J 3/0632 370/218 |
| 8,149,880 B1* | 4/2012 | Cho et al. ....................... 370/503 |
| 2004/0044941 A1* | 3/2004 | Hatley ............................ 714/752 |
| 2007/0258700 A1* | 11/2007 | Ivashin et al. .................... 386/96 |
| 2011/0063988 A1* | 3/2011 | Lee ..................... H04L 41/5009 370/252 |
| 2012/0327954 A1* | 12/2012 | Iourtchenko et al. ......... 370/474 |

OTHER PUBLICATIONS

MacHay, D., "Timestamping on the 7150 Series," Arista EOS Central, Feb. 11, 2013, <https://eos.aristanetworks,com/2-013/02/timestamping-on-the-7150-series>.

* cited by examiner

*Primary Examiner* — Umar Cheema
*Assistant Examiner* — Gregory P Tolchinsky
(74) *Attorney, Agent, or Firm* — McDermott Will & Emery LLP (57) ABSTRACT

A device for instrumentation and traffic disposition of a network using one or more time-stamps may include a receiving port to receive a data packet. A device configuration module may be configured to determine whether the device is a boundary device located on a boundary of an instrumented sub-network of the network. If the determination is made that device is the boundary device, a frame processing module may insert a first time-stamp at a first offset from a frame checksum (FCS) field in a data frame associated with the data packet. Otherwise, a corresponding time-stamp may be inserted at a second offset from the FCS field. The one or more time-stamps may enable a receiving endpoint device of the network to determine timeliness information associated with the data packet.

20 Claims, 4 Drawing Sheets

METHOD AND IMPLEMENTATION FOR NETWORK INSTRUMENTATION AND TRAFFIC DISPOSITION WITH TIMESTAMPS

CROSS-REFERENCE TO RELATED APPLICATIONS

This application claims the benefit of priority under 35 U.S.C. §119 from U.S. Provisional Patent Application 61/865,979 filed Aug. 14, 2013, which is incorporated herein by reference in its entirety.

TECHNICAL FIELD

The present description relates generally to communication networks, and more particularly, but not exclusively, to a method and implementation for network instrumentation and traffic disposition with timestamps.

BACKGROUND

A private network may include a number of nodes such as switches and endpoint devices. Data packets transmitted from one endpoint device and received by another endpoint device may travel through one or more hops (e.g., switches), which may result in a latency. Some applications may be highly latency sensitive and may have to use low-latency switches and endpoint devices and/or traffic engineered networks. For these applications, the operating system on the host machine may be bypassed or even field-programmable gate-arrays (FPGAs) may be employed, instead of typical hosts, as endpoint devices to achieve ultra-low processing latency.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In one or more aspects, examples of methods and implementations are described for network instrumentation and traffic disposition using one or more timestamps. A method may facilitate determining timeliness information of a data packet received at an endpoint device of a network after going through one or more hops (e.g., at one or more switches) based on time-stamps created in the hops. The endpoint device may use the timeliness information to enforce one or more policies. The multiple time-stamps of the subject method may be provided in a time-stamp portion created in a data frame associated with the packet (e.g., a data packet). The time-stamp portion of the data frame may be processed independently without parsing a payload portion of the data frame. The disclosed solution may provide observability of network delays, which can result in identifying and improving bottlenecks in the network. The method may allow timely response to new information without over-constraining the network with tight controls on latency jitter, including traffic congestion.

Figure 1:
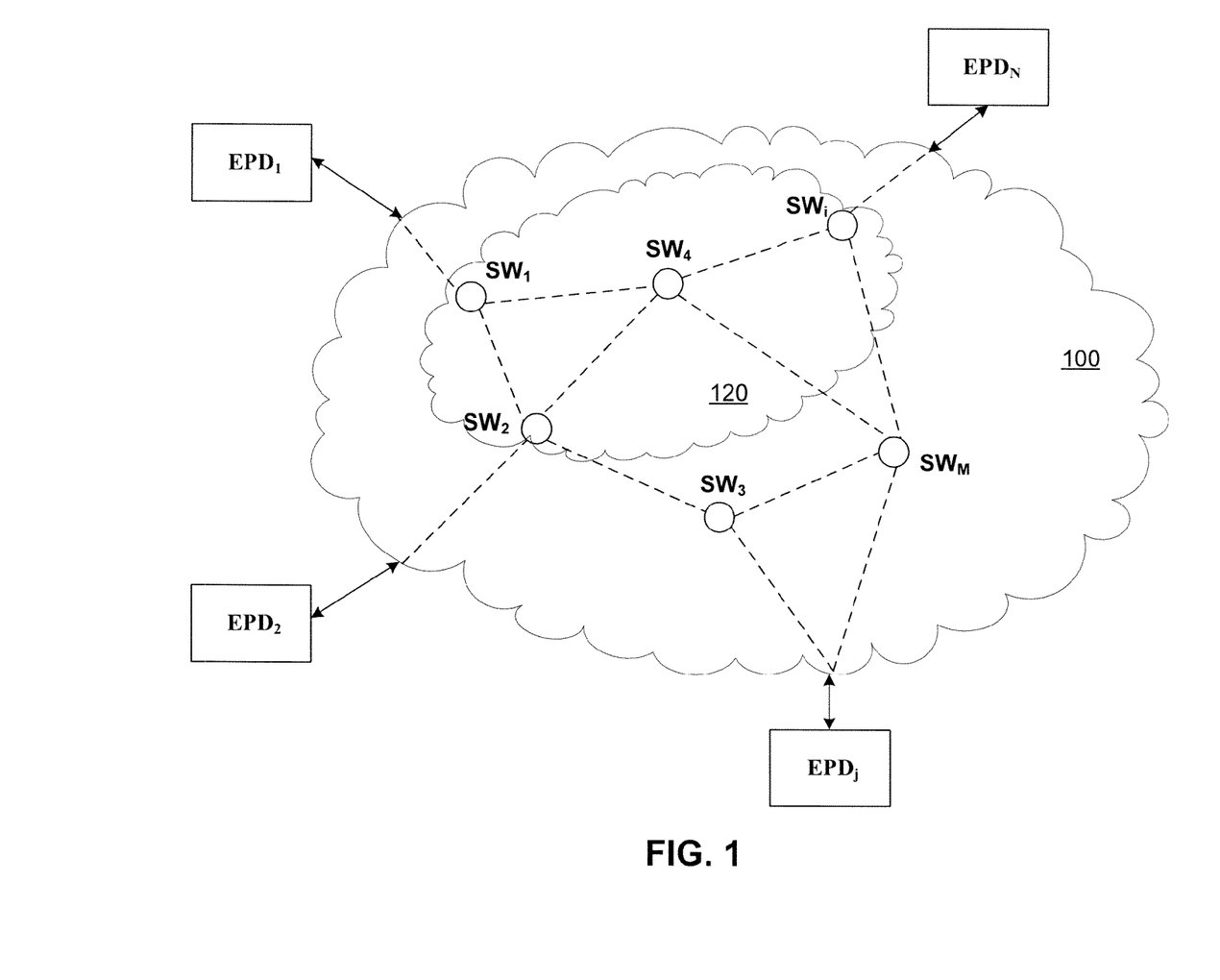
FIG. 1 illustrates an example of a network including an instrumented sub-network for traffic disposition with timestamps in accordance with one or more implementations.

FIG. 1 illustrates an example of a network (e.g., 100) including an instrumented sub-network (e.g., 120) for traffic disposition with timestamps in accordance with one or more implementations of the subject technology. Examples of the network 100 may include an Ethernet network such as a private network including a data-center network, an enterprise network, or other private networks. The network 100 includes a number of devices (e.g., nodes) such as multiple switches (e.g., $SW_1, SW_2 \ldots SW_M$) and a number of endpoint devices (e.g., $EPD_1, EPD_2 \ldots EPD_N$). An endpoint device may be a source (e.g., sending endpoint device) or a destination (e.g., receiving endpoint) of a data or control packet. Packets transmitted by an endpoint device may hop through a number of switches before reaching a destination endpoint device.

The switches of the entire or a portion of the network 100 (e.g., instrumented sub-network 120) may be instrumented for network traffic disposition. In other words, switches included in the instrumented sub-network 120 may be enabled for collecting (and processing) data corresponding to performance of the network 100 with regard to data traffic. For the network 100, a device may be identified to be a boundary device, if the device is the first device in the instrumented sub-network 120 that receives a packet from an endpoint device. In the exemplary instrumented sub-network 120, switches $SW_1$, $SW_2$, and $SW_i$ can be identified as the boundary devices, as these switches belong to the instrumented sub-network 120 and are the first devices to receive any packet from corresponding endpoint devices $EPD_1$, $EPD_2$ and $EPD_N$.

In one or more implementation of the subject technology, a switch (e.g., $SW_i$) may receive a data packet (e.g., from the endpoint device $EPD_N$ or another switch such as $SW_4$). A hardware or a software module in the switch $SW_i$ may determine, whether the $SW_i$ is a boundary device. If the determination is made that device is the boundary device, a first time-stamp may be inserted in a field in a data frame associated with the data packet, otherwise a time-stamp may be inserted in another field in the data frame, as described in more detail herein.

Network timestamps are used for network monitoring, which may otherwise require internal network links that are instrumented. The network traffic may be mirrored to a separate instrumentation network (e.g., a network that does not carry production traffic but exists specifically for the purpose of carrying instrumentation data), and timestamps may be applied to the traffic sent to the instrumentation network. Existing solutions do not address endpoint device's need for observability and may have to face with traffic correlation that may involve identifying characteristics of multiple traffics as they travel through the network, which may not be a trivial problem for out-of-band (e.g., associated with an external instrumented network) instrumentation. Determining packet timeliness may be quite challenging and no standard method exists for such determination. Consequently, reliance has to be made on maintaining low-latency networks and controlling overall network jitter by, for example, overdesigning, which may overconstrain the problem and lead to higher costs, without providing the endpoint devices with packet-level observability to deal with rare higher latency events that can still occur. The solution disclosed herein allows for network instrumentation that can follow every packet through the network. In particular, in some aspects of the subject technology, the time-stamps associated with only the first hop may be recorded to limit growth of data frames, in case desired. The subject technology further allows receiving endpoint devices to enforce policy based on the timeliness information derived from the time-stamps inserted in the data frame of each data packet.

Figure 2A:
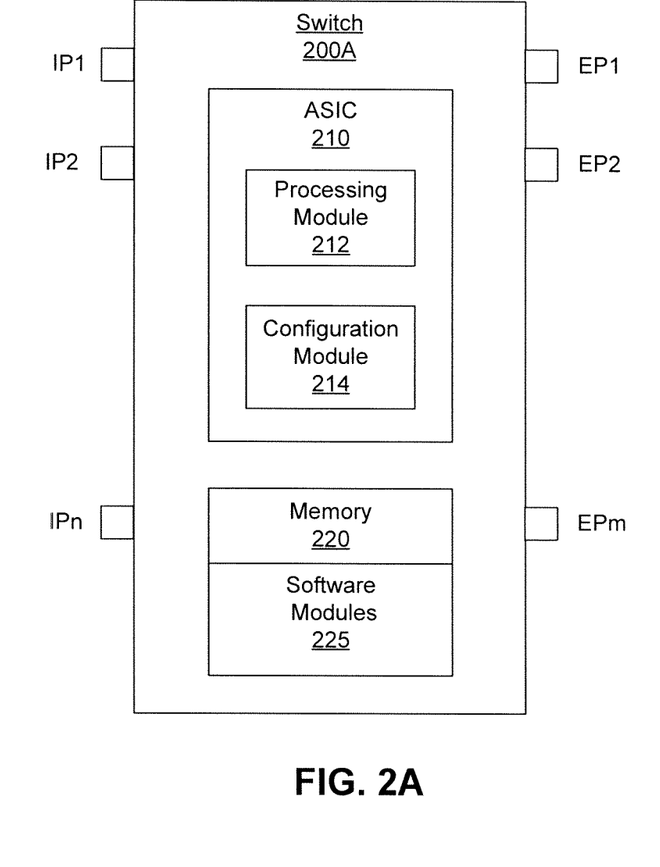
FIGS. 2A-2B illustrate examples of a switch and an endpoint device of an instrumented sub-network for traffic disposition with timestamps in accordance with one or more implementations.
Figure 2B:
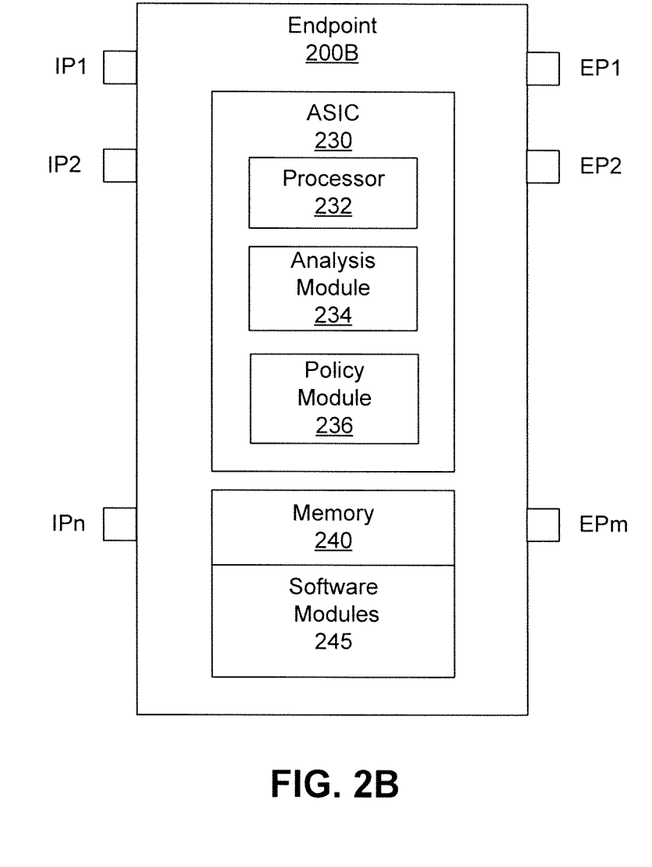

FIGS. 2A-2B illustrate examples of a switch (e.g., 200A) and an endpoint device (e.g., 200B) of an instrumented sub-network 120 of FIG. 1 for traffic disposition with timestamps in accordance with one or more implementations of the subject technology. The switch 200A includes a number of ingress (input) ports IP1-IPn and multiple egress (output) ports EPD1-EPm. The switch 200A may further include a hardware component such as an application specific integrated circuit (ASIC) 210 which in some embodiments may be implemented as a field-programmable logic array (FPGA), and memory 220. The ASIC 210 may include a processing module 212 and a configuration module 214. The processing module may include a frame processing module as described herein. In some aspects, the Switch 200A may include a separate processor such as a general-purpose processor, a processor core, or a multi-core processor.

The memory 220 may include a RAM, DRAM, SRAM, T-RAM, Z-RAM, TTRAM, or any other storage media. The memory 220 may include software modules 225 that when executed by a processor (e.g., processing module 212) can perform some or all of the functionalities of the ASIC 210, specifically, the configuration module 214. In other words, some or all of the functionalities of the configuration module 214 and even the processing module 212 (e.g., frame processing) may be implemented in software, which may be included in the software module 225 or stored in another storage and executed by a processor.

In one or more implementations, a receiving port such as one of ingress ports IP1-IPn of the switch 200A may receive a data packet form another switch or and endpoint device of the network 100 of FIG. 1. The device configuration module 214 may be configured to determine whether the switch 200A is a boundary device located on a boundary of an instrumented sub-network 120 of the network 100. If the switch 200A is a boundary device then the frame processing module may insert a first time-stamp (e.g. showing the receiving time of the packet at the switch 200A or the departure of the packet from the switch 200A) at a first offset from a frame checksum sequence (FCS) field in a data frame associated with the data packet. The FCS field may exist in almost all data frames and can assist in error detection. If the switch 200A is not a boundary device, the frame processing module may insert a time-stamp at a second offset from the FCS field. In some embodiments, the data frame associated with the received packet may optionally include a time-stamp count field. The frame processing module 214 may increment content of the time-stamp count field upon receipt of the packet at the switch 200A. In one or more aspects, the time-stamps may be inserted in the data frame of the data packet at some or all of the switches (e.g., the switch 200A) at the receive time and/or departure time of the data packet. The second offset may be determined based on a width of the time-stamp count field and a width of a first time-stamp field associated with the first time-stamp. In other words, the frame processing module may insert a time-stamp corresponding to a non-boundary device immediately above a first time-stamp field associated with the first time-stamp.

The endpoint device 200B may be enabled to monitor traffic disposition of a network such as the network 100 by using one or more time-stamps. In some aspects, the endpoint device 200B includes a number of ingress ports IP1-IPn and multiple egress ports EPD1-EPDm similar to the switch 200A. A count of the ingress ports IP1-IPn and egress ports EPD1-EPDm of the switch 200A may be different from that of the endpoint device 200B. The endpoint device 200B may further include a hardware component such as an ASIC 230, which in some embodiments may be implemented as an FPGA, and memory 240. The ASIC 230 may include a processor 232, an analysis module 234, and a policy module 236. The processor 232 may include a frame processor as described herein. In some aspects, the endpoint device 200B may include a separate processor such as a general-purpose processor, a processor core, or a multi-core processor.

The memory 240 may include a RAM, DRAM, SRAM, T-RAM, Z-RAM, TTRAM, or any other storage media. The memory 240 may include software modules 245 that when executed by a processor (e.g., processor 232) can perform some or all of the functionalities of the ASIC 232, specifically, the functionalities of the analysis module 234, and the policy module 236. In other words, some or all of the functionalities of the analysis module 234 and the policy module 236, and even the processor 232 (e.g., frame processing) may be implemented in software, which may be included in the software module 245 or stored in another storage and executed by a processor.

The endpoint device 200B (e.g., $EPD_j$ of FIG. 1) may receive a data packet at one of the ingress ports IP1-IPn, for example, at IP1 from a switch of the network 100 (e.g., $SW_3$). The data packet may include a time-stamp in an associated data frame. The frame processor may parse a time-stamp portion of the data frame and examine a time-stamp count field in that portion of the data frame to determine a time-stamp count of the data packet. If the time-stamp count is one, a first time-stamp may be extracted from the time-stamp portion of the parsed data frame at a first offset from the FCS field of the data frame. Otherwise, a corresponding time-stamp can be extracted from the time-stamp portion of the parsed data frame at a corresponding offset from the FCS field. The analysis module 234 may determine timeliness information associated with the received data packet by using the extracted time-stamp.

In one or more aspects, the timeliness information associated with the received data packet may indicate the length of time it may take for the data packet to reach the endpoint device 200B, after being transmitted by the source or any of the intermediate hops (e.g., switches), or the length of time the data packet has to spend passing through the instrumented sub-network (e.g., 120 of FIG. 1). An important note here is that the timeliness information may be retrieved from the data frame in a substantially constant time. In other words, the time it takes to retrieve timeliness information from the data frame is substantially the same for all packets, independent of the packet size. The processing of the timeliness information may involve a substantially small amount of time and buffering. In one or more aspects, using the time-stamps, the analysis module 234 may obtain information related to network delays incurred by the data packet at each network hop (e.g., switch).

In some aspects, the analysis module 234 may further be configured to use the time-stamp information to compile and analyze the information related to the network delays across a number of data packets over time. The analysis module 234 may utilize the information related to the network delays to determine short-term and long-term latency and jitter performance of individual links of the network. The policy module 236 may use the timeliness information for additional policy enforcement. In some aspects, as an example of the additional policy enforcement, the policy module 236 may cause dropping a data packet if the timeliness information indicates that the data packet has arrived substantially later than expected. In one or more aspects, an endpoint device that is delay sensitive can discard, deprioritize, or change the type of processing applied to a delayed data packet. An endpoint device with real-time constraints can delay processing of packets that arrive before their processing deadline in order to continue other time-sensitive processing. Other policies may be enforced based on the timeliness information.

Figure 3:
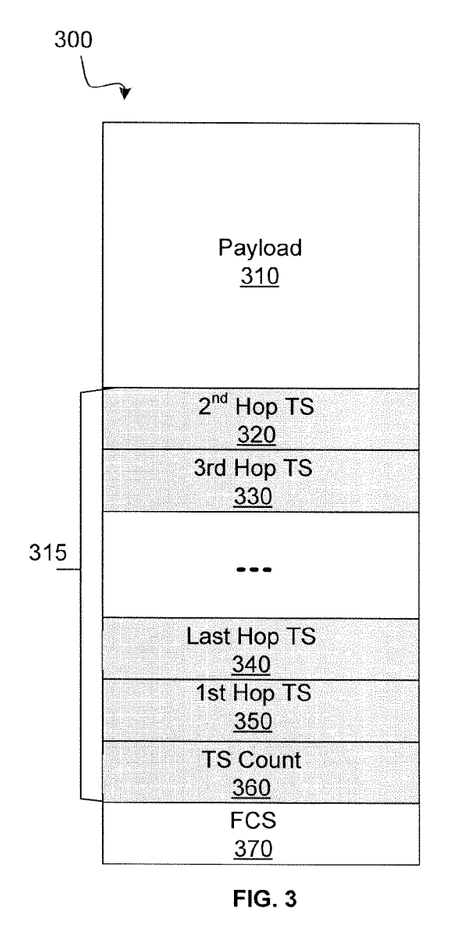
FIG. 3 illustrates an example of a data frame of a packet configured with time-stamps for network instrumentation and traffic disposition in accordance with one or more implementations.

FIG. 3 illustrates an example of a data frame (e.g., 300) of a packet configured with time-stamps for network instrumentation and traffic disposition in accordance with one or more implementations of the subject technology. The data frame 300 may include all components of a typical data frame such as one or more preamble fields (not shown in FIG. 3, for simplicity), a payload field 300, and an FCS field 370 plus an additional time-stamp portion 315. The time-stamp portion 315 includes a time-stamp (TS) count field 360 (optional), and a field for each of the time-stamps associated with various hops, such as a first hop TS field 350, a second hop TS field 320, a third hop TS field 330 . . . and a last hop TS field 350. The TS count field 360 can be adjacent to the FCS field 370, and the first hop TS field 350 may be inserted at a fixed offset from the FCS field 370 (e.g., regardless of the number of time-stamps) which is defined by the width of the TS count field 360. The first hop TS field 350 corresponds to a switch that is a boundary switch (e.g., any of switches $SW_1$, $SW_2$, and $SW_i$ of FIG. 1). The configuration module of a boundary switch may know the time-stamp count (e.g., one) by configuration, without examining the TS count field 360. The second hop TS field corresponding to the second hop is inserted in the TS portion 315 at a border line with the payload field 310. The following time-stamps corresponding to the third and later time-stamps are inserted, in between the second and first time-stamps, as shown in FIG. 3. In other words, for a non-boundary switch, the current time stamp that is the last hop time stamp is inserted in the last hop TS field 340, which is immediately above the first hop TS field 350. After insertion of each time-stamp, the content of the TS count field 360 (if exist) is incremented by one.

In some aspects, for certain applications (e.g., applications sensitive to increased resource utilization), only the first hop TS may be recorded to limit data frame growth as the packet hops through the network. For these applications, insertion of the TS count field 360 may not be required. In one or more aspects, some nodes (e.g., switches) of the network may not be configured to record a time-stamp in the data frame of a received data packet. In some applications, only the first and the last time-stamps may be processed. This is made convenient by positioning the last hop TS field 340 adjacent to the first hop TS field 350, so that it can be retrieved independent of other time-stamps.

In one or more implementations, the time-stamp portion 315 may be processed by the processing module 212 of FIG. 2A and/or the processor 232 of FIG. 2B, which are in the Ethernet layer of the network. The modules that are in higher level than the Ethernet layer, when parsing the data frame 300, may not be able and/or may not need to parse the time-stamp portion 315 of the data frame 300. Similarly, the processing module 212 and/or the processor 232 and/or any other suitable hardware or program module that needs to access time-stamp information of the data frame 300, may not need to look for that information in other fields than the time-stamp portion 315. This may result in lower processing delay. Further, the extraction of the time-stamp information of the data frame 300 may be done independent from regular packet parsing (e.g., parsing of the data frame of the packet), even when the number of network hops is not known in advance. In some aspects, the endpoint device (e.g., 200B of FIG. 2B) may benefit from the low latency associated with the subject technology and may not need to rely on mechanisms at higher levels to control latency in order to improve jitter (e.g., irregularities in the early or late arrival of packets) in the network.

Figure 4:
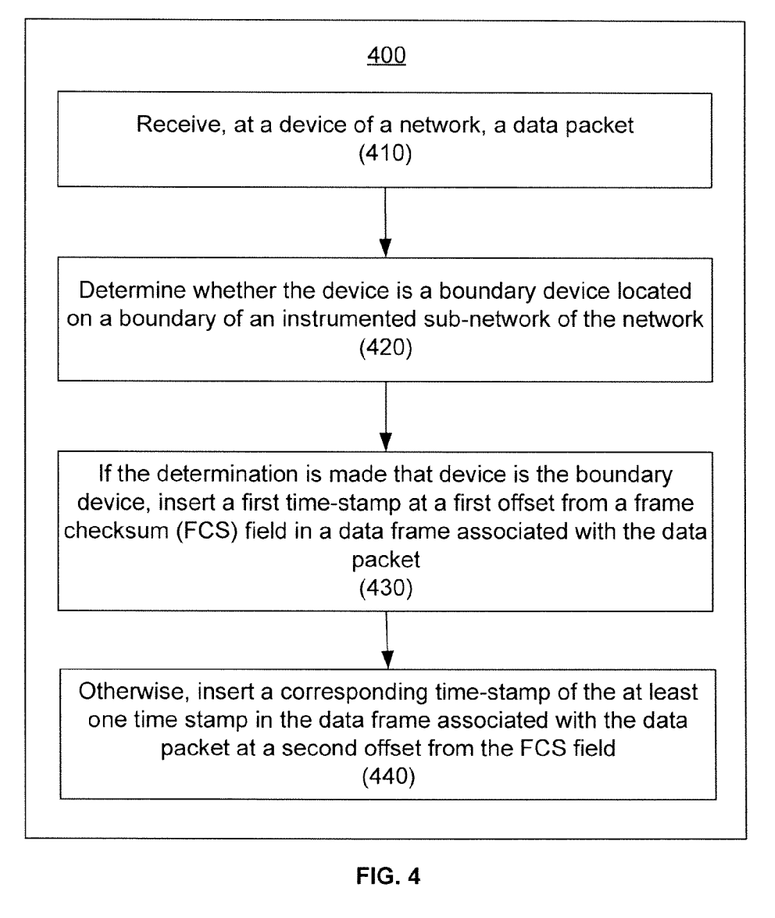
FIG. 4 illustrates an example of a method for network instrumentation and traffic disposition with timestamps at a switch in accordance with one or more implementations.

FIG. 4 illustrates an example of a method (e.g., 400) for network instrumentation and traffic disposition with timestamps at a switch (e.g., $SW_i$ of FIG. 1) in accordance with one or more implementations. A data packet may be received at a device (e.g., any of switches $SW_1$, $SW_2$ . . . $SW_M$ of FIG. 1) of a network (e.g., network 100 of FIG. 1) (410). It is determined (e.g., by 214 of FIG. 2A) whether the device is a boundary device (e.g., any of switches $SW_1$, $SW_2$, or $SW_i$ of FIG. 1) located on a boundary of an instrumented sub-network (e.g., 120 of FIG. 1) of the network (420). If it is determined that the device is a boundary device, a first time-stamp (e.g., content of 350 of FIG. 3) may be inserted at a first offset from a frame checksum (FCS) field (e.g., 370 of FIG. 3) in a data frame (e.g., 300 of FIG. 2A) associated with the data packet (430). Otherwise, a corresponding time-stamp (e.g., content of any of 320, 330 . . . or 340) may be inserted in the data frame associated with the data packet at a second offset from the FCS field (440). The time-stamps may allow a receiving endpoint device (e.g., any of $EPD_1$, $EPD_2$ . . . or $EPD_N$ of FIG. 1) of the network to determine timeliness information associated with the data packet.

Figure 5:
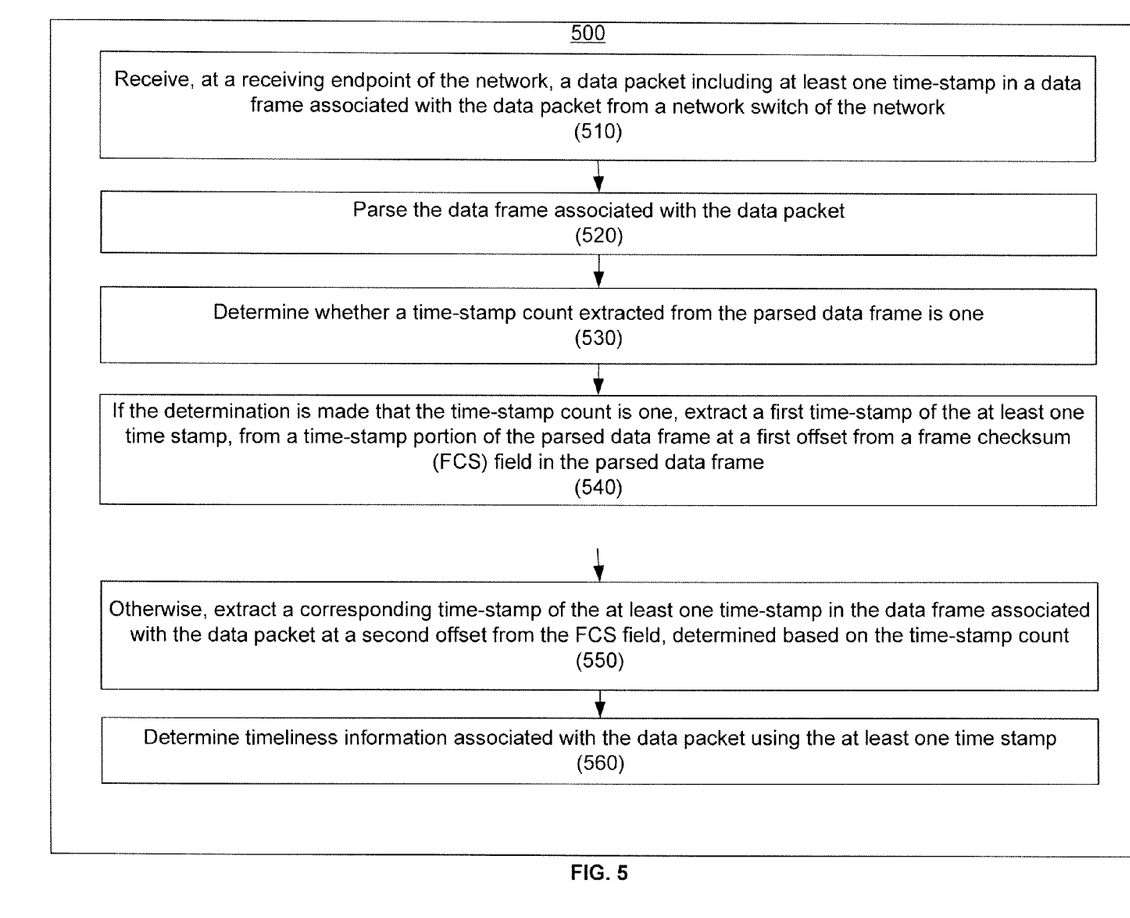
FIG. 5 illustrates an example of a method for network instrumentation and traffic disposition with timestamps at an endpoint device in accordance with one or more implementations.

FIG. 5 illustrates an example of a method (e.g., 500) for network instrumentation and traffic disposition with timestamps at an endpoint device 200B of FIG. 2B in accordance with one or more implementations of the subject technology. The steps of the method 500 do not need to be performed in the order shown and one or more steps may be omitted. A data packet including one or more time-stamps (e.g., content of 320, 330, 340, and/or 350 of FIG. 3) may be received, at a receiving endpoint device (e.g., 200B of FIG. 2B) of a network (e.g., 100 of FIG. 1), in a data frame (e.g., 300 of FIG. 3) associated with the data packet from a network switch (e.g., any of switches $SW_1$, $SW_2$, or $SW_i$ of FIG. 1) of the network (510). The data frame associated with the data packet may be parsed (520). It may be determined whether a time-stamp count (e.g., content of 360 of FIG. 3) extracted from the parsed data frame is one (530). If the determination is made that the time-stamp count is one, a first time-stamp (e.g., content of 350) may be extracted, from a time-stamp portion (e.g., 315 of FIG. 3) of the parsed data frame, at a first offset from a frame checksum (FCS) field (e.g., 370 of FIG. 3) in the parsed data frame (540). Otherwise, a corresponding time-stamp (e.g., content of any of 320, 330, or 340 of FIG. 3) of the time-stamps in the data frame associated with the data packet may be extracted at a corresponding offset from the FCS field (550). The corresponding offset may be determined based on the time-stamp count (560). Timeliness information associated with the data packet may be determined using the one or more time-stamps.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature of the subject technology.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for network instrumentation and traffic disposition using at least one time-stamp, the method comprising:
receiving, at a device of a network, a data packet;
determining, by the device, whether the device is a boundary device located on a boundary of an instrumented sub-network of the network;
if the determination is made that the device is the boundary device, inserting a first time-stamp at a first offset from a frame checksum (FCS) field in a data frame associated with the data packet; and
if the determination is made that the device is not the boundary device, inserting a respective time-stamp corresponding to the device in the data frame associated with the data packet at a second offset from the FCS field,
wherein at least one time-stamp facilitates determination of timeliness information associated with the data packet, and
wherein the first offset from the FCS field is defined based on a width of a time-stamp count field included in the data frame associated with the data packet.

2. The method of claim 1, wherein the received data packet is a data packet originated from a sending endpoint device of the network, and wherein the timeliness information associated with the data packet enables the receiving endpoint device of the network to enforce policies based on the timeliness information.

3. The method of claim 1, wherein the data frame associated with the data packet includes the time-stamp count field at a fixed offset from the FCS field.

4. The method of claim 1, further comprising determining the second offset based on the width of the time-stamp count field and a width of a first time-stamp field associated with the first time-stamp.

5. The method of claim 1, further comprising incrementing content of the time-stamp count field when the data packet is received by the device, wherein a time-stamp portion of the data frame associated with the data packet is processable independent of a payload portion of the data frame associated with the data packet.

6. The method of claim 1, wherein time-stamps inserted in the data frame associated with the data packet enable an endpoint device to indirectly obtain information related to network delays incurred by the data packet at each network hop.

7. The method of claim 6, wherein time-stamps inserted in the data frame associated with the data packet enable an endpoint device to compile and analyze the information related to the network delays across a plurality of data packets over time in order to determine short-term and long-term latency and jitter performance of individual links of the network.

8. A device, comprising:
a receiving port configured to receive a data packet;
a device configuration circuitry configured to determine whether the device is a boundary device located on a boundary of an instrumented sub-network of a network;
a frame processing circuitry configured to:
insert a first time-stamp at a first offset from a frame checksum (FCS) field in a data frame associated with the data packet, if the determination is made that device is the boundary device; and
insert a respective time-stamp of the at least one time-stamp in the data frame associated with the data packet at a second offset from the FCS field, if the determination is made that the device is not the boundary device,
wherein the at least one time-stamp enables a receiving endpoint device of the network to determine timeliness information associated with the data packet, and
wherein the first offset from the FCS field is defined based on a width of a time-stamp count field included in the data frame associated with the data packet.

9. The device of claim 8, wherein the received data packet is a data packet originated from a sending endpoint device.

10. The device of claim 8, wherein the frame processing circuitry is further configured to insert the time-stamp count field in the data frame associated with the data packet at a fixed offset from the FCS field.

11. The device of claim 8, wherein the frame processing circuitry is further configured to:
increment content of the time-stamp count field when the data packet is received by the device; and
determine the second offset based on the width of the time-stamp count field and a width of a first time-stamp field associated with the first time-stamp, wherein a time-stamp portion of the data frame associated with the data packet is processable independent of a payload portion of the data frame associated with the data packet.

12. A device, comprising:
a receiving port configured to receive a data packet including at least one time-stamp in a data frame associated with the data packet from a network switch of a network;
a frame processor configured to: parse the data frame associated with the data packet;
determine whether a time-stamp count extracted from the parsed data frame is one; and
if the determination is made that the time-stamp count is one, extract a first time-stamp of the at least one time-stamp, from a time-stamp portion of the parsed data frame, at a first offset from a frame checksum (FCS) field in the parsed data frame;
if the determination is made that the time-stamp count is not one, extract a time-stamp of the at least one time-stamp, from the data frame associated with the data packet, having a corresponding offset from the FCS field determined based on the time-stamp count;
and an analysis circuitry configured to determine timeliness information associated with the data packet using the at least one time-stamp,
wherein the first offset from the FCS field is defined based on a width of a time-stamp count field included in the data frame associated with the data packet.

13. The device of claim 12, wherein the frame processor is further configured to extract the time-stamp count from the time-stamp count field in the data frame associated with the data packet at a fixed offset from the FCS field.

14. The device of claim 12, wherein the analysis circuitry is configured to obtain information related to network delays incurred by the data packet at each network hop using the at least one time-stamp.

15. The device of claim 12, further comprising a policy circuitry configured to enforce policies based on the timeliness information.

16. The device of claim 12, wherein the analysis circuitry is further configured use the at least one time-stamp to compile and analyze the information related to the network delays across a plurality of data packets over time in order to determine short-term and long-term latency and jitter performance of individual links of the network.

17. A method of monitoring traffic disposition of a network using at least one time-stamp, the method comprising:
- receiving, at a receiving endpoint device of the network, a data packet including at least one time-stamp in a data frame associated with the data packet from a network switch of the network;
- parsing the data frame associated with the data packet;
- determining whether a time-stamp count extracted from the parsed data frame is one;
- if the determination is made that the time-stamp count is one, extracting a first time-stamp of the at least one time-stamp, from a time-stamp portion of the parsed data frame, at a first offset from a frame checksum (FCS) field in the parsed data frame;
- if the determination is made that the time-stamp count is not one, extracting a time-stamp of the at least one time-stamp, from the data frame associated with the data packet, having a second offset from the FCS field; and
- determining timeliness information associated with the data packet using the at least one time-stamp,
- wherein the first offset from the FCS field is defined based on a width of a time-stamp count field included in the data frame associated with the data packet.

18. The method of claim 17, further comprising extracting the time-stamp count from the time-stamp count field in the data frame associated with the data packet at a fixed offset from the FCS field; and further comprising enforcing policies based on the timeliness information.

19. The method of claim 18, further comprising:
- determining the second offset based on the width of the time-stamp count field and a width of a first time-stamp field associated with the first time-stamp; and
- facilitating obtaining information related to network delays incurred by the data packet, at each network hop, using the at least one time-stamp.

20. A device, comprising:
- a receiving port configured to receive a data packet;
- memory to store a plurality of modules; and
- a processor configured to execute instructions included in the plurality of modules, wherein the plurality of modules executable by the processor comprise:
- a device configuration module configured to determine whether the device is a boundary device located on a boundary of an instrumented sub-network of a network;
- a frame processing module configured to:
  - insert a first time-stamp at a first offset from a frame checksum (FCS) field in a data frame associated with the data packet, if the determination is made that device is the boundary device; and
  - insert a respective time-stamp of the at least one time-stamp in the data frame associated with the data packet at a second offset from the FCS field, if the determination is made that the device is not the boundary device,
- wherein the at least one time-stamp enables a receiving endpoint device of the network to determine timeliness information associated with the data packet, and
- wherein the first offset from the FCS field is defined based on a width of a time-stamp count field included in the data frame associated with the data packet.

* * * * *